Jan. 26, 1954

P. H. SCHAEFFER 2,667,097

MAGNETOPHONIC MUSICAL APPARATUS

Filed Feb. 7, 1952

Inventor.
Pierre H. Schaeffer
By:
Henderoth, Lind & Ponack
Attorneys.

Jan. 26, 1954 P. H. SCHAEFFER 2,667,097
MAGNETOPHONIC MUSICAL APPARATUS
Filed Feb. 7, 1952 4 Sheets-Sheet 3

Inventor
Pierre H. Schaeffer
By
Shenderoth, Lind & Ponack
Attorneys.

Jan. 26, 1954  P. H. SCHAEFFER  2,667,097
MAGNETOPHONIC MUSICAL APPARATUS
Filed Feb. 7, 1952  4 Sheets-Sheet 4
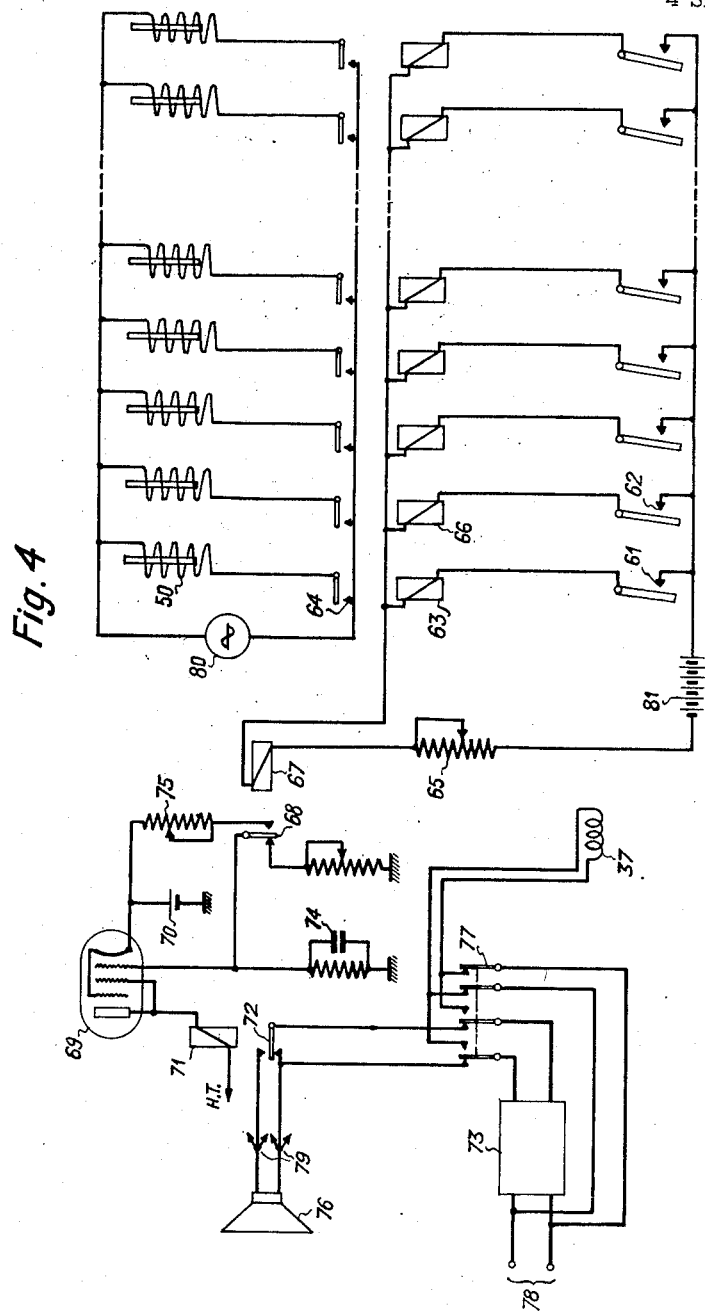
Inventor
Pierre H. Schaeffer
By:
Theuleroth, Lind & Ponack
Attorneys.

Patented Jan. 26, 1954

2,667,097

UNITED STATES PATENT OFFICE 2,667,097

MAGNETOPHONIC MUSICAL APPARATUS

Pierre H. Schaeffer, Paris, France

Application February 7, 1952, Serial No. 270,319

3 Claims. (Cl. 84—1.28)

The subject matter of the present invention is a magnetophonic apparatus with a musical keyboard and, more particularly, an apparatus in which each of the tapes of a plurality of looped magnetophonic tapes can be driven for a time, which is variable at will, at one of the speeds of a plurality of speeds of travel.

The object of the present invention is to produce a musical apparatus by means of which sounds or noises of any nature, which have previously been recorded, can be emitted according to a tessitura and with a rhythm determined by a musician, each of these sounds or noises constituting a fragment of a composite sequence of the type of those which form the means of expression peculiar to music known as "concrete" music.

The spectrum of each sound or of each noise emitted may be transposed in a plurality of ratios corresponding to a plurality of speeds of travel of the magnetophonic tapes. The means for controlling the speed of each tape is constituted by keys similar to that of a piano keyboard and to a given key corresponds a given speed of travel. The tape travels at this speed during the whole period of the depression of the key.

The invention will be better understood on reading the following detailed description with the aid of accompanying drawings, in which:

Fig. 4 shows the electric circuits of the apparatus.

Figure 1:
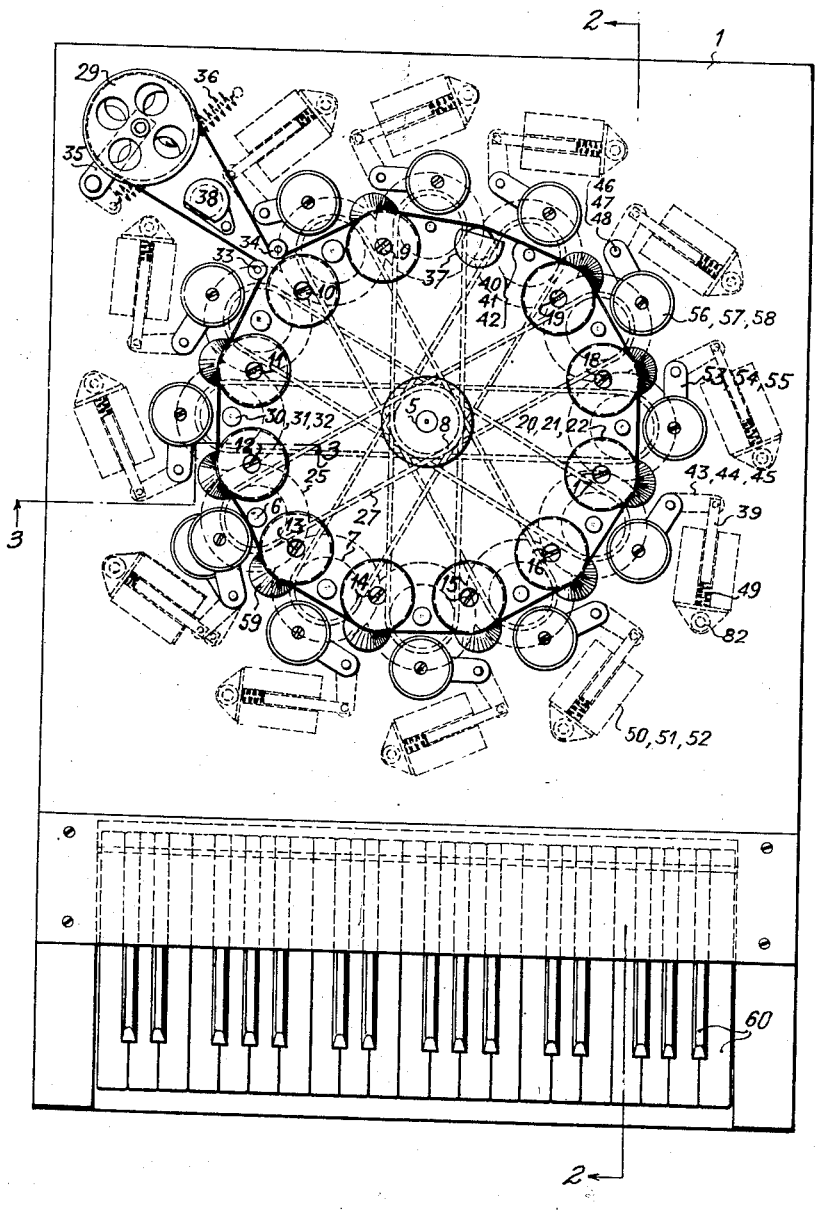
Fig. 1 is a representation of the apparatus as seen from above.
Figure 2:
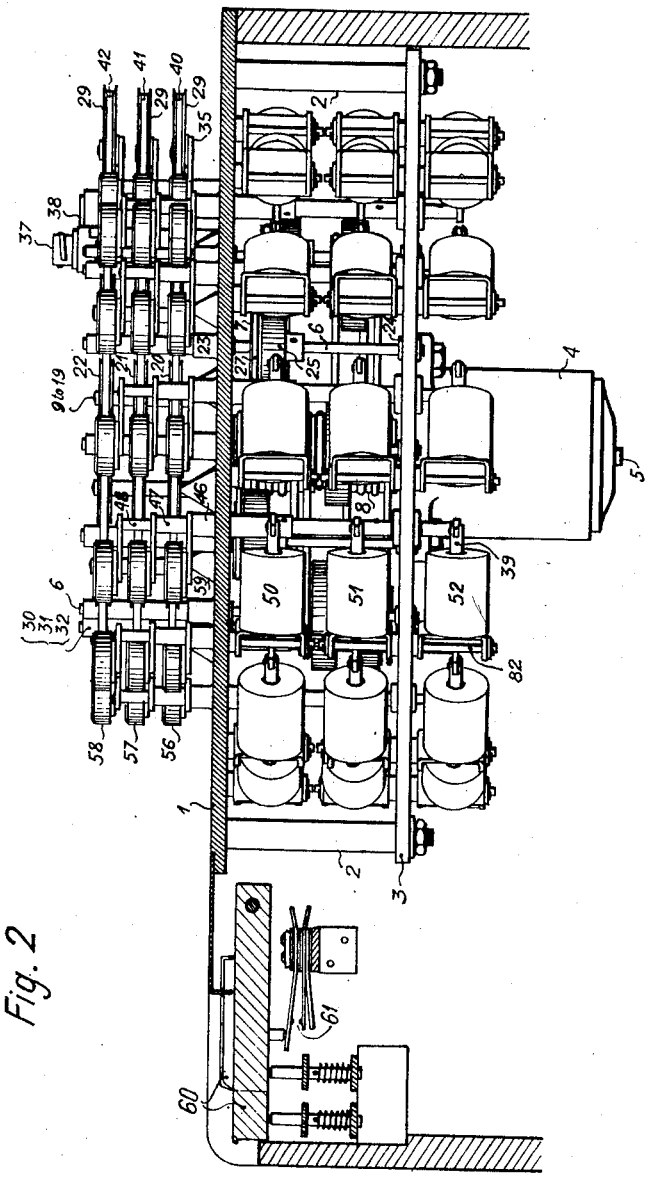
Fig. 2 is a view of the apparatus in elevation and, partly in section to show the features of the casing and the piano-like key, the section taken along the line 2—2 of Fig. 1.
Figure 3:
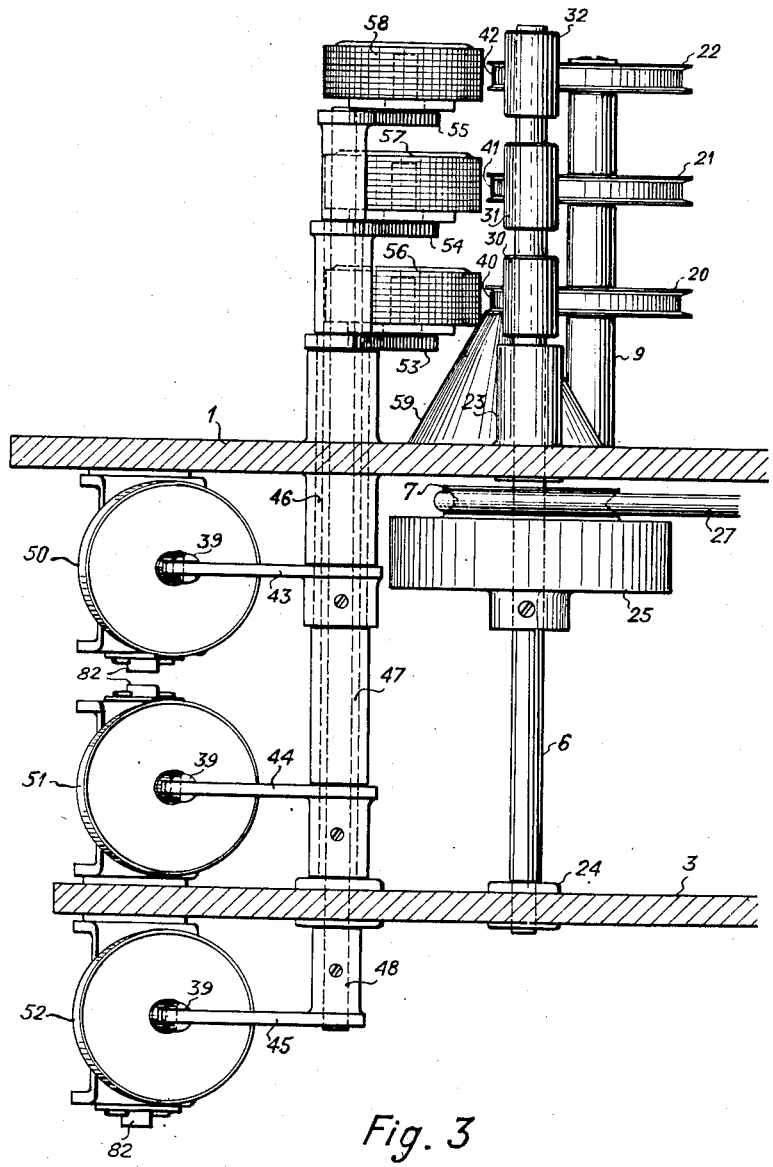
Fig. 3 represents in greater detail the means for driving and engaging one of the magnetophonic tapes; a section of the casing is taken along line 3—3 of Fig. 1

Referring to Figs. 1 and 2, I denotes the board of a stand under which a plate 3 is fixed by means of pillars 2. Beneath the plate there is fixed a driving motor 4, for example of the asynchronous-synchronized type adapted to be given two speeds of rotation one of which is double the other.

Such motors are well-known and they comprise for example a stator with six poles and windings having an equal angular distance between one another around said stator and a rotor also with six windings which may be at will fed with a direct current or short-circuited. When the first, third and fifth stator windings are fed respectively with the three phase currents of a power supply, the other stator windings not being energized, a rotative field having the same angular frequency as the power supply is generated in the stator. When the first and fourth, second and fifth, third and sixth stator windings are energized respectively by the three phase currents of the power supply, the angular frequency of the rotative field is half the first one. In said conditions, when the rotor windings are energized with direct current, the motor starts like an asynchronous motor and, when said windings are short-circuited, it behaves like a synchronous motor.

The shaft 5 of this motor passes through the plate 3 and carries, in the space between the said plate and the stand 1, a plurality of pulleys 8 which, in the example described, are twelve in number.

Eleven shafts 9 to 19 are fixed perpendicularly to the stand 1 and on the upper side of the said stand and they are arranged at eleven of the apices of a regular dodecagon having, as its centre, the extension of the shaft 5, the twelfth apex being thus occupied, as will be seen hereinafter, by a reproducing head. Each of these shafts carries thee guide pulleys 20, 21 and 22 arranged at three levels parallel to the plane of the stand.

Twelve shafts 6 are fixed perpendicularly to the stand, also at the apices of a regular dodecagon, and each of these shafts is arranged at the middle of the space which separates two consecutive shafts of the guide pulleys.

The shafts 6 are mounted in bearings 23 fixed on the stand 1 and in bearings 24 fixed on the plate 3. Mounted on the shafts 6 are pulleys 7 having diameters which are equal to one another and to that of the pulleys 8. Each of the pulleys 7 is joined to a flywheel 25.

Driving belts 27 connect each pulley 8 to one of the pulleys 7. Each shaft 6 is terminated at its upper part by three superposed rollers 30, 31 and 32, integral with said shaft, the rollers, such as 30, being situated at the same level as the guide pulleys 20, the rollers, such as 31, being situated at the same level as the guide pulley 21, and the rollers, such as 32, being situated at the same level as the guide pulley 22.

The rollers 30, 31 and 32 integral with a given shaft 6 are of the same diameter. There are twelve sets of rollers such as 30, 31 and 32 and the rollers of each of these sets have diameters which are equal and which, from one set to another, are related to one another as are the numbers:

$$1, \frac{25}{24}, \frac{9}{8}, \frac{9}{8} \times \frac{25}{24}, \frac{5}{4}, \frac{4}{3}, \frac{4}{3} \times \frac{25}{24}, \frac{3}{2}, \frac{3}{2} \times \frac{25}{24}, \frac{5}{3}, \frac{5}{3} \times \frac{25}{24}, \frac{15}{8}$$

which correspond to the progression of Zarlin's natural scale.

A looped magnetophonic tape 40 passes over the twelve guide pulleys 20 and the twelve rollers 30. In the same way, a looped magnetophonic tape 41 passes over the twelve guide pulleys 21 and the twelve rollers 31, and a looped magnetophonic tape 42 passes over the twelve guide pulleys 22 and the twelve rollers 32. In addition, each of these tapes passes over a tension system constituted by the two guide pulleys 33 and 34 and by the tension pulley 29 mounted on a lever 35, the movable arm of which, that carries the pulley, is urged outwards by a spring 36. Only the tension system corresponding to the magnetophonic tape 40 is represented in Fig. 1, but it is to be understood that there are identical and superposed tension systems for the two other tapes.

Each of the tapes passes in front of a recording and reproducing head 37 and in front of a deleting head 38 which can be moved away. It has been seen that the head 37 occupies the twelfth apex of a dodecagon the other apices of which are occupied by the shafts 9 to 19 of the guide pulleys.

On the right of each shaft 6 there is arranged a triple concentric-shaft unit 46—47—48 which consists of an external hollow shaft 46, an intermediate hollow shaft 47 and an internal solid shaft 48. Each of these shafts is provided, at its two ends, with a lever i. e., 43 and 53 in the case of shaft 46, 44 and 54 in the case of shaft 47 and 45 and 55 in the case of shaft 48. The lower levers 43, 44 and 45 of the shafts 46, 47, and 48 respectively are hinged to plunger cores such as 39 which pass into the interior of electromagnets 50, 51 and 52 respectively and are returned by springs 49 into the position which corresponds to the plunger core which has issued from the electromagnet. The electromagnets 50, the plunger cores of which are hinged to the levers such as 43, are fixed beneath the stand 1, the electromagnets 51, the plunger cores of which are hinged to the levers such as 44, are fixed above the plate 3 and the electromagnets 52, the plunger cores of which are hinged to the levers such as 45, are fixed beneath the plate 3.

The upper levers, such as 53, carry, on their ends, rollers 56 situated in the plane of the rollers 30 and, in the same way, the upper levers, such as 54 and 55, carry, on their ends, rollers 57 and 58 which are situated in the planes of the rollers 31 and 32 respectively. The rollers 56, 57 and 58 are coupling rollers which are loose on their axes and lean respectively against the driving rollers 30, 31 and 32 of the magnetophonic tapes when the plunger cores which operate them are in the attracted position. When no coupling roller leans against the corresponding driving roller, the magnetophonic tape to which these rollers pertain is not driven because this tape, in the line between two guide pulleys, passes slightly in front of the driving roller that is situated at the middle of this line. On the other hand, the magnetophonic tape is driven when one of the coupling roller leans against the associated driving roller; this presses the tape between these two rollers and the said tape is driven at a speed which is equal to the peripheral speed of the corresponding driving roller.

A cone 59 is placed beneath each guide pulley 20, 21 and 22 for the purpose of facilitating the placing of the magnetophonic tapes into position.

The stand 1 comprises a keyboard with thirty-six keys 60 which are arranged, for usual reasons, like the keys of three consecutive octaves of a piano keyboard. Each octave corresponds to a magnetophonic tape.

Each key 60 of a particular octave, when depressed, closes a contact 61. Each contact made causes a particular coupling roller to be put into the operative position and to break the short circuiting of the output of the amplifier corresponding to this octave. Fig. 4 represents the electric circuits which are operated by each key contact and it relates to the twelve keys of a single octave, the keys of the two other octaves constituting sets which are identical with the set represented in Fig. 4.

Each contact 61 closes the circuit of a relay 63, the contact 64 of which, in turn, closes the circuit of an electromagnet 50 to a source of voltage 80. The variable resistance 65 is regulated in such a manner that, if two contacts 61 and 62 are actuated simultaneously, that is to say if two keys of the same octave are depressed simultaneously, the current delivered by the source 81 into the coils of the relays 63 and 66 is insufficient to energise these two relays.

In this way, it is impossible for two electromagnets such as 50 to be energised simultaneously; the result of such a simultaneous closure would, as will be seen hereinafter, be to tear the magnetophonic tape.

The closing of one of the contacts 61, 62 . . . also has the effect of energising the relay 67 which attracts its movable contact 68. When the movable contact 68 is at rest, the electronic tube 69 is blocked, its grid being at a lower potential than that of its cathode which is polarised positively by the source 70. No current passes in the coil of the relay 71. The movable contact 72 of this relay short-circuits the output of the amplifier 73. When the movable contact 68 is working, the electronic tube 69 is unblocked, its grid being brought to a potential which is equal to that of its cathode. This unblocking is effected with a time constant which is determined by the values of the capacity 74 and of the resistance 75 and which is of the order of half a second. The relay 71 is energised, its movable contact 72 breaks the short-circuit of the output of the amplifier 73 and the output of this amplifier is connected to the loud-speaker 76.

This loud-speaker is also connected, at 79, to amplifiers such as 73 and pertaining to the two other magnetophonic tapes. A reversing switch 77 enables the recording and reproducing head 37 to be connected, at will, either to the input of the amplifier 73, in which case the output is connected to the loud-speaker 76 by means of the movable contact 72, or to the output of the amplifier when the input of the latter is connected to the terminals 38 on which is disposable the modulation corresponding to the sounds or noises to be recorded.

The operation of the magnetophonic apparatus is as follows:

First of all, the matter recorded on the tapes is deleted by passing a high-frequency current into the deleting heads 38 which are arranged in contact with the tapes. These deleting heads are then moved away. Then, the three reversing switches, such as 77, having been placed in the "recording" position, pure or complex sounds or noises are recorded on the magnetophonic tapes 40, 41 and 42.

The three reversing switches are then placed on the "reproducing" position and the operator depresses one or more keys 60 of the different octaves. The effect of the depression of a key is to engage the magnetophonic tape pertaining to the octave which corresponds to this key and to cause it to travel in front of the reproducing heads 37 at a speed which is equal to the peripheral speed of the driving roller on which the coupling roller, which has been operated by the key, has been brought to lean. With a certain delay, which is predetermined in order that the tape should have reached its working speed, the output of the amplifier is connected to the loudspeaker and the recorded sound or noise is reproduced either with the particular frequencies which compose it or with the frequencies transposed at a certain ratio which is equal to the ratio between the speed of the tape at the instant of recording and the speed of the said tape at the instant of its reproduction. The adjustment of the electric circuits prevents one and the same tape from being driven by two different rollers; this would, owing to their different peripheral speeds, have the effect of tearing the tape.

As the motor has two speeds of rotation, one of which is twice the other, every sound or noise recorded can be reproduced with twenty-four different tessituras, and, since there are three magnetophonic tapes, it is possible to mix three different sounds or noises and, if necessary, to transpose them differently.

Although the invention has been described in respect of one particular embodiment, it is to be understood that modifications are possible, especially as regards the number of speeds of rotation of the motor and the ratios between these speeds, the number of magnetophonic tapes and the ratios between the diameters of the driving rollers, and it is, therefore, not intended to limit the patent granted otherwise than necessitated by the scope of the appended claims.

What I claim is:

1. A magnetophonic musical apparatus comprising a frame, a plurality of vertical shafts mounted in said frame at the apices of a regular polygon within said frame, a motor with a plurality of speeds driving said shafts at the same angular speed, a plurality of driving rollers mounted integrally with and superposed on said shafts at different horizontal levels, each of the driving rollers mounted on one shaft having the same diameter and the driving rollers mounted on different shafts having different diameters, a plurality of looped magnetophonic tapes which are equal in number to the number of rollers superposed on the shafts, non-driven guide pulleys located at the same horizontal levels as the driving rollers and arranged for causing said tapes to travel in front of all the driving rollers of a horizontal level without leaning against said rollers, pick-up heads associated with each tape, audio means and controlling means of said audio means connected with said heads, a plurality of removable coupling rollers associated respectively with the driving rollers and each adapted to bring a magnetophonic tape to frictionally lean against the associated driving roller and to be trained by said driving roller, a piano-like depressible key for each coupling roller for moving said roller into frictional leaning with the associated driving roller and for operating the controlling means of the audio means whereby the speed of one tape is controlled according to the peripheral speed of the driving roller against which the coupling roller associated with the depressed piano-like key is brought to lean and whereby the audio means reproduces the musical sound recorded on said tape.

2. A magnetophonic musical apparatus according to claim 1, wherein the driving rollers located in a given horizontal level are twelve in number and have diameters which are related to one another like the frequencies of the notes of the musical scale and wherein the piano-like depressible keys controlling the coupling rollers associated with the driving rollers of said level are twelve in number and form an octave whereby the musical sound recorded on the tape located at said level may be played at twelve different tessituras.

3. A magnetophonic musical apparatus comprising a frame, a plurality of vertical shafts mounted in said frame at the apices of a regular polygon, a motor with a plurality of speeds driving said shafts at the same angular speed, a plurality of driving rollers mounted integral with and superposed on said shafts at different horizontal levels, the driving rollers mounted on one shaft having the same diameter and the driving rollers mounted on different shafts having different diameter, a plurality of looped magnetophonic tapes which are equal in number to the number of rollers superposed on the shafts, non-driven guide pulleys located at the same horizontal levels that the driving rollers arranged for causing said tapes to travel in front of all the driving rollers of a horizontal level without leaning against said rollers, pick-up heads associated with each tape, audio means connected with said heads, controlling and delaying means inserted between said heads and said audio means, a plurality of removable coupling rollers associated respectively with the driving rollers and each adapted to bring a magnetophonic tape to frictionally lean against the associatied driving roller and to be trained by said driving roller, a piano-like depressible key for each coupling roller for moving said roller into frictional leaning with the associatied driving roller and for operating the controlling and delaying means whereby the speed of one tape is controlled according to the peripheral speed of the driving roller against which the coupling roller associated with the depressed piano-like key is brought to lean and whereby the audio means reproduces the musical sound recorded on said tape with a delay introduced by the controlling and delaying means equal to the time during which the tape takes its full speed.

PIERRE H. SCHAEFFER.

References Cited in the file of this patent

UNITED STATES PATENTS

| Number | Name | Date |
|---|---|---|
| 2,178,706 | Severy | Nov. 7, 1939 |
| 2,549,145 | Vagtborg | Apr. 17, 1951 |